United States Patent [19]
Kraus

[11] 3,956,741
[45] May 11, 1976

[54] BI-DIRECTIONAL ZERO RADIUS AUTO-FIRE PROBE AND AMPLIFIER

[75] Inventor: Ronald G. Kraus, Akron, Ohio

[73] Assignee: Kraus Instruments, Inc., Stow, Ohio

[22] Filed: June 14, 1973

[21] Appl. No.: 369,874

[52] U.S. Cl. .............................. 340/199; 340/211; 340/282; 235/151.32
[51] Int. Cl.[2] ................................... G08C 19/08
[58] Field of Search ............................ 340/199

[56] References Cited
UNITED STATES PATENTS

| | | | |
|---|---|---|---|
| 2,627,119 | 2/1953 | Graham | 340/199 |
| 3,142,794 | 7/1964 | Pegram | 340/199 |
| 3,184,858 | 5/1965 | Shaper | 340/199 |
| 3,212,324 | 10/1965 | Martin | 340/199 |
| 3,354,399 | 11/1967 | Houpt | 340/199 |
| 3,456,132 | 7/1969 | Dechelotte | 340/199 |
| 3,569,820 | 3/1971 | Nishimuta | 340/199 |
| 3,668,701 | 6/1972 | Mayberry | 340/199 |
| 3,670,318 | 6/1972 | Fathauer | 340/199 |
| 3,683,344 | 8/1972 | Saito | 340/199 |
| 3,684,961 | 8/1972 | Muir | 340/199 |

*Primary Examiner*—Thomas B. Habecker
*Attorney, Agent, or Firm*—Oldham & Oldham Co.

[57] ABSTRACT

Disclosed is a unique probe and amplifier circuit for use with a digital height gauge or other measuring device. Fundamentally, the invention utilizes a probe tip operatively connected to the primary and secondary windings of an LVDT; the core of the LVDT being fixedly positioned between the windings. Deflection of the probe in either direction along the axis of the core results in an output signal from the LVDT, the amplitude of the signal being indicative of the magnitude of the deflection. The signal is translated into a varying DC level, the value of the DC level being linearly related to the deflection of the probe. The DC voltage is applied to an operational amplifier having selective feedback networks associated therewith which prescribe the gain of the amplifier and hence its subsequent effect upon a calibrated meter connected to the output thereof. The meter provides visual readings indicative of the deflection of the probe. The operational amplifier has a DC bias associated therewith to compensate for the diameter of the probe tip such that measurements may be taken in a bi-directional manner without compensation having to be made for the probe tip diameter. Also connected to the output of the operational amplifier is circuitry for producing a binary state DC signal at that time at which the meter indicates that a measurement should be taken.

11 Claims, 4 Drawing Figures

BI-DIRECTIONAL ZERO RADIUS AUTO-FIRE PROBE AND AMPLIFIER

BACKGROUND OF THE INVENTION

Heretofore in the field of measuring devices generally and digital height gauges specifically various types of probe assemblies have been utilized to sense that exact moment or position at which the probe makes contact with the object being measured. One such probe assembly utilizes the commonly known dial indicator; this approach utilizing a totally mechanical probe requiring the visual discernment of the operator's eye to determine when contact is made. Although great accuracy can be achieved with heighth gauges utilizing dial indicator probes, such probes substantially decrease the operative speed of the gauging system since they are totally mechanical in structure and manual in operation.

To increase the operational speed of heighth gauge systems the art has developed certain electronic probe assemblies. These probe assemblies are generally such that when the probe makes contact with a surface an electric signal is created thus indicating to the appropriate circuitry that a measurement should be made. Certain of these electronic probe assemblies utilize pivotal probes which are operatively connected to inductor-type circuitry such that the pivotal movement of the probe caused by contact of the probe with an object will create a signal through the inductor-type circuitry thus signaling that a measurement must be made. Such probe assemblies require that the probe utilized therewith be of a specific length since the signal created is indicative of a pivotal motion. Consequently, varying length probes may not be utilized with the same assembly unless compensation means are provided for with the inductor-type circuit.

Some known electronic probes utilize LVDT's wherein the probe is connected to the movable core thereof while the LVDT housing, containing the coils thereof, is fixedly attached to the probe assembly proper. As is well known to those skilled in the art, the cores of such LVDT's are generally spring biased against a stop pin such that contact of the probe attached to the core changes the positional relationship between the core and the coils thus changing the output signal from the LVDT. Being mechanically biased by means of the spring, such probe assemblies are uni-directional only; that is, the probe may sense only in a downward or upward moving relationship with respect to the object to be sensed but not in both directions. The mechanically biased probe assembly is not electrically zero centered so that bi-directional measurements may be made. For such a probe assembly to be utilized for making measurements in either direction of travel, the probe assembly must be inverted each time that the direction of movement of the assembly is changed.

Further, many known probe assemblies are such that sensing is accomplished at the exact moment that the probe makes contact with the surface to be measured. Such probe assemblies do not automatically take into account the diameter of the probe tip being utilized but leave that factor to the user to take into account when recording his measurements.

Consequently, it is an object of the instant invention to present a bi-directional zero radius auto-fire probe and amplifier wherein the probe moves in a straight line so that it may be of any of numerous lengths.

Yet another object of the invention is to present such a probe assembly wherein a LVDT is utilized to create the measurement signal and wherein the LVDT is electrically zero centered so that bi-directional measurements may be taken.

Still a further object of the invention is to provide a measurement probe assembly wherein compensation for the radius of the probe tip is automatically made.

Yet another object of the invention is to present a measurement probe assembly which is substantially immune to jarring or shaking which, in many known probe assemblies, results in false readings.

Another object of the invention is to present a measurement probe assembly which has selectable degrees of sensitivity and which automatically produces a binary logic signal when the probe tip is displaced a distance equivalent to the radius thereof.

These objects and other objects which will become apparent as the detailed description proceeds are achieved by a bi-directional, zero radius, auto-fire probe and amplifier assembly for utilization with a digital height gauge for creating signals indicating when a measurement should be taken, comprising an LVDT having primary and secondary coils and a core positioned therebetween; a probe having a tip thereon operatively connected to and movable with the coils; first circuit means connected to the LVDT for receiving electrical signals therefrom indicative of the positional relationship between the coils and the core and producing a DC output signal therefrom; and second circuit means connected to and receiving the DC output signal from the first circuit means, the second circuit means creating the signals indicating that a measurement should be taken.

For an understanding of the apparatus and techniques of the instant invention reference should be had to the following detailed description and accompanying drawings wherein.

Figure 1:
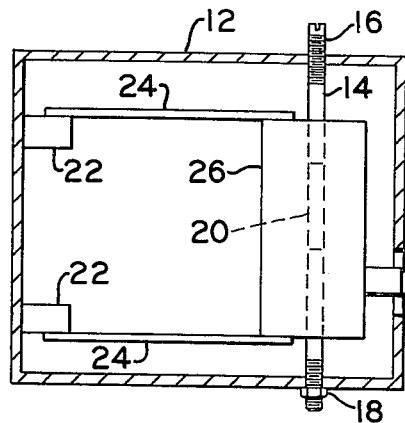
FIG. 1 is a cut-away frontal view of the probe assembly showing the mechanical structure thereof.

It should be understood that specific values of circuit elements illustrated in the drawings are for purposes of presenting a preferred embodiment and best mode of the invention only and any of a plurality of element values might be selected while staying within the confines of the invention.

For a thorough understanding of the utilization of the apparatus of the instant invention in a digital heighth gauge measuring system, reference should be had to co-pending patent application Ser. No. 303,627 which has now issued into U.S. Pat. No. 3,851,329. As can be understood by reference to this co-pending patent application, the digital heighth gauge with which the instant invention would be utilized would generally be such that an inductosyn-type scale, characterized by the presence of precisely spaced etched copper coils, would be provided with a movable slider thereon which is characterized by the presence of a probe. This movable slider or probe assembly is shown in FIG. 1 of the instant application and is designated generally by the numeral 10. As is mentioned in the aforementioned co-pending patent application, the probe assembly 10 contains more elements than are shown in FIG. 1 but, for purposes of simplicity, the apparatus relating directly to the instant invention is all that is shown within the figure. As can be seen, the assembly 10 comprises a casing 12 which threadedly receives a screw 14 having a head 16 at one end and a lock nut 18 at the other. The core 20 of an LVDT is fixedly attached to the screw 14 and thus fixedly engaged with the casing 12 of the slider or probe assembly 10. Further attached to the casing 12 are rigid fixed structures or standards 22 which may be either appropriately attached to the casing 12 or extruded therefrom. Fixedly engaging the standards 22 are spring steel leaves 24, one such leaf attached to each of the standards. The spring steel leaves 24 are, at the other end thereof, affixed to a housing 26. As will be further discussed hereinafter, the housing 26 contains therein the primary and secondary windings of an LVDT, the secondary windings thereof creating signals indicative of the degree of contact of the probe tip 30 with an object being sensed. It should be readily appreciated now that the probe element 28 is operatively connected to the coils of the LVDT while the casing 12 is operatively connected to the core 20. Hence, the output of the LVDT will be indicative of the motional relationship between the probe assembly 28 and the casing 12.

Figure 2:
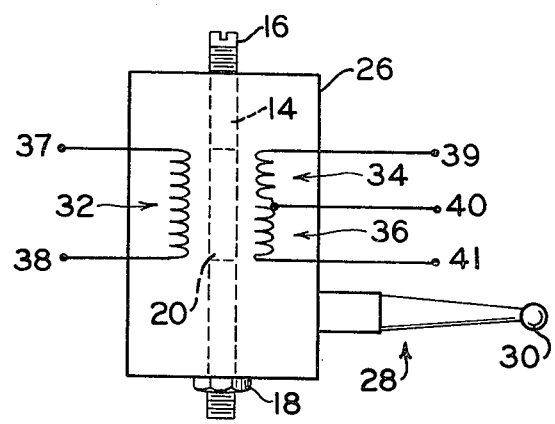
FIG. 2 is a highly schematic showing of the LVDT core and coils and their relationship with the probe tip.

As can be seen from the highly schematic showing of FIG. 2, the screw 14 having a core 20 fixedly attached thereon is positionally arranged between the primary coil 32 and the secondary coils 34, 36 of an LVDT. Coils 32, 34, 36 are mechanically and structurally attached to the housing 26 of the LVDT and hence, relative motion between the coils and the core 20 may be effectuated by a force exerted upon the probe tip 30. It should be noted that the coils 32, 34 and 36 have associated therewith electrical terminals 37–41 and it should be further noted that the coil 34 is oppositely wound with regard to the coil 36. The coils 34 and 36, though oppositely wound, contain the same number of windings.

Figure 3:
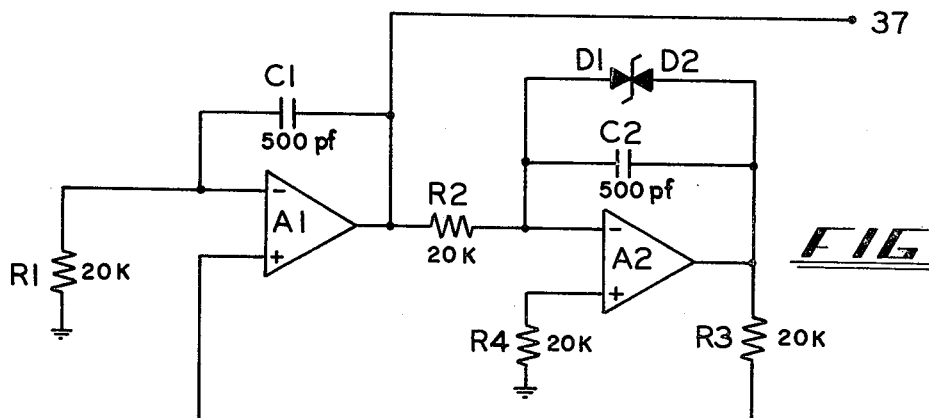
FIG. 3 is a schematic diagram of the oscillator utilized in the invention to develop the primary coil signals for the LVDT.

Referring now to FIG. 3, the oscillator utilized for inducing a sinusoidal signal across the terminals 37, 38 of the primary coil 32 of the LVDT may be seen. While any of numerous oscillators might be used, the best mode of the invention would teach that an operational amplifier A1 feeds a second operational amplifier A2 with the appropriate provision of feedback circuitry interconnecting the two. The amplifier A1 has the output thereof capacitively fed back to the negative input through a capacitor C1, the negative input being grounded through an appropriately selected resistor R1. The output of the amplifier A1 feeds the negative input of the amplifier A2 through a resistor R2, the output of the amplifier A2 being fed back to the negative input thereof through the back to back zener diodes D1, D2 and the capacitor C2. In the instant invention the diodes D1 and D2 are arranged so as to limit the output pulse swing to plus or minus six volts about ground. The output of the amplifier A2 is connected to the RC circuit of R3, C3 and fed back to the positive input of the amplifier A1. Of course the positive input of the amplifier A2 is grounded through a resistor R4. With appropriately selected resistor and capacitor values, the outputs between the terminals 37, 38 will be a perfect sinusoidal wave of 17 KC swinging plus or minus six volts about ground. While any of numerous values might be utilized in the oscillator, it is preferred that the resistors R1–R4 all be 20K resistors and the capacitors C1–C3 be 500 pf. Further, it is preferred that the amplifiers A1, A2 of this circuit as well as all operational amplifiers utilized in this invention be Motorola or Fairchild 747's.

Figure 4:
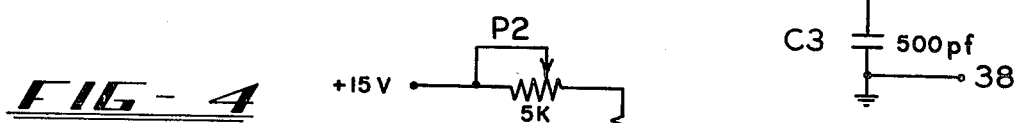
FIG. 4 is a schematic diagram of the circuitry receiving the output of the LVDT and creating measurement signals therefrom.
Figure 4:
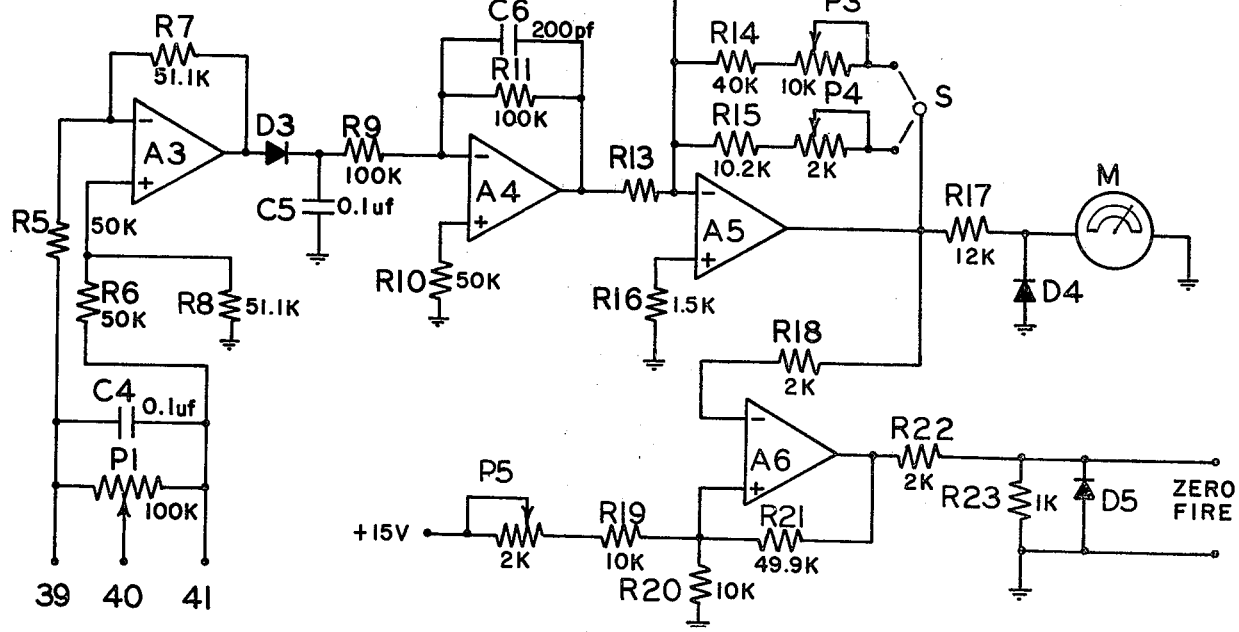

With reference now to FIG. 4, it can be understood that with the primary coil 32 excited by the oscillator of FIG. 3, outputs may be experienced between the terminals 39, 40 and 41 associated with the secondary coils of the LVDT. As can be seen, the center tap terminal 40 of the oppositely wound secondary coils 34, 36 is connected to the wiper arm of the potentiometer P1. As was mentioned above, the coils 34, 36 are quite identical in nature but for being oppositely wound and consequently, when identically coupled to the primary 32, the voltages incident to the positive and negative inputs of the amplifier A3 will be equal in amplitude but opposite in polarity and hence no output will be seen from the amplifier A3. Due to inherent differences in the mechanical structure of the coils 34 and 36, the potentiometer P1 is provided so that fine adjustments may be made thereby to compensate for inherent unbalance between the coils 34, 36, thus guaranteeing no output from the amplifier A3. Of course, this adjusting is done when the probe element 28 is not in contact with a surface and when the spring steel leaves 24 are holding the housing 26 in its neutral position. Thus it can be seen that the pot P1 is utilized to electrically zero or neutralize the LVDT of the probe assembly as distinguished from prior art models in which the LVDT has been mechanically biased.

A capacitor C4 is provided across the coils 34, 36 to eliminate quadrature harmonics which might exist between the two. The electrically balanced outputs of the LVDT are connected to the positive input of the amplifier A3 through the voltage divider comprising R6 and R8, and to the negative input thereof through the voltage divider comprising the input resistor R5 and the resistor R7. While any of numerous values might be used for the elements of the circuit, it is preferred that resistors R5 and R6 be 50K and the resistors R7 and R8 be 150K with the capacitor C4 being 0.02 uf.

It should be understood that with the potentiometer P1 properly adjusted and the probe 28 out of engagement with a surface such that the housing 26 is a neutral position, the output of the amplifier A3 will be at ground. However, if the probe tip 30 is brought down upon or up onto a surface the housing 26 will linearly deflect with respect to the screw 14 and consequently the coupling between the primary 32 and the secondaries 34 and 36 through the coil 20 will be changed. This of course is normal procedure in measuring a given object; that is, the slider or probe assembly can be moved downward or upward so that the probe tip 30 comes into contact with a surface of the object being measured. Such contact causes unbalance between the secondary coils 34 and 36 due to the difference in coupling between the primaries and secondaries experienced due to the change of positional relationship between the coils 32, 34, 36 and the core 20. Note that this unbalance may be caused by either an upward or downward movement of the probe tip 30. With the unbalance, a sinusoidal output signal indicative of the degree of disparity between the amplitudes of the pulses incident to the positive and negative inputs of the amplifier A3 is produced at the output thereof. This output signal then passes through the half wave rectifier comprising the diode D3, capacitor C5, and resistor R9. The resistor R9 is preferably of a high impedence so as to present a very stable DC level at the input of the amplifier A4 and to further provide for quick response of the circuitry to probe movement. The amplifier A4, having the positive input thereof terminated to ground through the resistor R10, has a filter feedback network comprising resistor R11 and capacitor C6 such that a buffer stage is provided. The output of the buffer stage or amplifier A4 will be a highly stable negative DC level proportional to the input level from the half wave rectifying circuit which is directly correlated with the output from the LVDT and consequently the movement of the probe element 28.

The output of the amplifier A4 feeds through the resistor R13 to the negative input of the linear operational amplifier A5. The positive input of the amplifier A5 is terminated to ground through the resistor R16 and hence, a negative output of the amplifier A4 indicating displacement of the probe tip 30 will result in a positive signal at the output of the amplifier A5. This positive signal feeds through the resistor R17 to the milliamp meter M, the graduations of which are indicative of the displacement of the probe tip 30. Two feedback networks, R14, P3 and R15, P4 are provided for the amplifier A5, these feedback circuits directly affecting the gain of amplifier A5 and hence the sensitivity of the meter M with respect to probe deflection. In the preferred embodiment of the invention the meter M would have 100 graduations thereon and one of the feedback circuits would result in a meter sensitivity of 0.000050 inches per graduation while the other feedback leg would result in a meter sensitivity of 0.00020 inches per graduation. Meter sensitivity is selected by means of a switch S which may be of any suitable nature. The trimming potentiometers P3 and P4 are provided in the feedback circuits for achieving fine adjustment of the meter M. With properly selected values for R14 and R15 one may adjust the potentiometers P3 and P4 such that the particular deflection of the needle of the meter M will indicate that the probe tip 30 is at a point at which a measurement can be taken. It is desirable, though not required, that half-scale deflection of the meter M will be evidenced when the probe tip 30 is in a position for making a measurement, but of course any degree of deflection may be selected by the resistance values in the feedback circuits to indicate that a measurement should be made. It should at this time be briefly noted that a diode D4 is provided in parallel with the meter M to prevent the application of a negative voltage to the meter M.

Thus it can be seen that the user of the digital heighth gauge utilizing the instant invention may select a meter sensitivity by means of the switch S and then move the probe assembly 10 along an inductosyn-type scale until the probe tip 30 comes into contact with the object to be measured and then, at that point at which the meter M is deflected half scale, take a reading on the digital readout. Reference should again be had to the above-identified co-pending patent application for a true appreciation of this technique.

An important attribute of the instant invention is the provision of a DC bias circuit to compensate for the radius of the probe tip 30. A potentiometer P2 and resistor R12 are connected in series between a positive DC voltage source and the negative input of the amplifier A5. Hence a positive DC current is supplied to the negative input of the amplifier. Again using known techniques, the probe tip 30 may be brought down upon the top surface of a gauge block and then up on the bottom surface of an offset gauge block connected to the top of the first gauge block and readings of each point may be taken. The readings taken as the probe tip is brought down upon the surface and as the probe tip is brought up unto the surface will be the same only when compensation is made for the radius or diameter of the probe tip. In other words, for the measurements to be the same the probe tip must have an effective zero radius. This zero radius characteristic is achieved by adjustment of the potentiometer P2 which in turn adjusts the positive DC voltage to the negative input of the amplifier A5. When the potentiometer P2 is adjusted to that point at which both readings are the same regardless of the direction in which the probe tip 30 is deflected, the probe tip 30 will be effectively of a zero radius and measurements will be made only after the probe tip 30 has been deflected a distance equivalent to the radius thereof. It can be seen that with the zero radius characteristic no compensation need be made in the measurements taken for the radius of the probe tip used. This is especially important since the probe assembly of the instant invention is bi-directional in nature.

While the apparatus of the instant invention may readily be used in a totally manual manner, as described above, with the operator visually sensing the deflection of the meter M to determine when a measurement should be made, it is most desirable that measurements may automatically be made when the probe tip has contacted the surface and been deflected the predetermined amount. As can be seen from FIG. 4, the output of the amplifier A5 which is indicative of the deflection of the zero radius probe, feeds the negative input of the amplifier A6 through the resistor R18. The positive input of the amplifier A6 has a DC bias applied thereto through the voltage divider comprising the potentiometer P5 and the resistors R19 and R20. The output of the amplifier A6 will be normally positive due to the DC bias at the positive input of the amplifier A6. The output of the amplifier A5 will increase as the deflection of the probe tip 30 also increases. At that point at which the negative input of the amplifier A6 exceeds the positive input of the amplifier A6 the output thereof will instantaneously change to its negative state. This point of transition of the output of the amplifier A6 may be adjusted by means of the potentiometer P5. It is most desired that the potentiometer P5 be adjusted so that the output of the amplifier A6 will switch at that point in time that the meter M has been deflected to that graduation which indicates that a measurement is to be made, this deflection of the meter M being preferably half-scale. Thus it can be seen that the DC output of the amplifier A6 will change states at exactly that point in time at which a measurement is to be made, thereby creating a signal which may be applied to a calculator or digital counter network as described in the above-identified co-pending patent application. It should be noted that the output of the amplifier A6 is fed back through the resistor R21 so as to provide a hysteresis-type triggering effect for the amplifier A6. Once the negative input of the amplifier A6 has caused the output thereof to go to its negative state, the positive input of the amplifier is lowered by the feedback through the resistor R21 and the associated voltage divider network such that the triggering level of the amplifier A6 will now be lower than it previously was so that jitter or ripple or other noise-type fluctuations incident to the negative input of the amplifier A6 will not cause subsequent triggering of the amplifier A6. In other words, the hysteresis feedback network associated with the amplifier A6 merely insures that the positive-triggering level of the negative input will be at a higher level than the negative-going triggering level so that false measurements will not be made.

The voltage divider comprising the resistors R22 and R23 and the diode D5 at the output of the amplifier A6 are used to translate the output of the amplifier A6 to a suitable binary logic level. The diode D5 inhibits the negative output of the amplifier A6 while the voltage divider comprising R22 and R23 limits the positive level. Effectively then there is created a negative going fast transition voltage change created at that instant at which the measurement is to be taken. This output may be applied then to the logic associated with a digital readout or calculator-type apparatus to automatically effectuate the measurement. Thus the instant invention may be utilized in an auto-fire mode.

It should be readily recognized that rapid movements of the slider or probe assembly 10 could result in output signals of the amplifier A5 due to the inertia of the probe 28 and the housing 26. False output signals from the amplifier A5 could readily trigger the amplifier A6 and thus initiate a zero fire pulse to the digital readout or calculator apparatus. This situation would constitute a serious problem and would require that extreme care be exercised by the users of the apparatus. However, as may be appreciated from the circuitry of FIG. 4, the application of a positive DC bias current to the negative input of the amplifier A5 to compensate for the radius of the probe tip 30 alleviates this problem. This DC bias guarantees that the output from the amplifier A5 will be inhibited until the probe tip 30 has been deflected a distance equivalent to the radius thereof. Consequently, any deflection of the probe 28 due to the rapid or jerky movement of the probe assembly 10 will not result in an output signal from the amplifier A5 unless the movement has been at least so great as to deflect the probe tip 30 in an upward or downward direction a distance equivalent to the radius thereof. Consequently, there is a presented a dead band equivalent to the diameter of the probe tip 30 through which the center of the probe tip 30 may move without effectuating an output signal from the amplifier A5. Generally the probe tip 30 will be 0.050 inches in diameter and, since the spring steel leaves 24 will be relatively stiff in nature, it is highly unlikely that accidental deflection of the probe 28 will be made of sufficient degree to cause an erroneous output signal.

This dead band provision which is achieved by the positive DC bias of the negative input of the amplifier A5 further compensates for the fact that upon taking a reading the probe 28 may not always return to exactly the same minute position but may be off one or two thousandth's of an inch. Since errors in return of the probe 28 will lie within the dead band, they will in no manner affect the accuracy of the probe assembly 10.

As mentioned hereinabove, probes of various lengths may be utilized with the instant invention without affecting the accuracy thereof. The probes may be threadedly attached or otherwise appropriately connected to the probe assembly so that easy replacement may be made. Of course, when the length of the probe is changed the force exerted thereby on the spring steel leaves 24 is also changed and hence the natural displacement of the housing 26 and the coils of the LVDT with respect to the core 20 is also changed. Means have been provided to compensate for the differences in natural displacement of the coils 32, 34, and 36 with respect to the core 20 when various probes are used. As was mentioned above, the core 20 is fixedly attached to a screw 14 having a head 16 at one end thereof and a lock nut 18 at the other end. When a new probe is attached to the probe assembly 10, adjustment of the screw 14 may be made so as to position the coil 20 at the electrically neutral position between the primary coil 32 and the oppositely wound secondary coils 34 and 36. As was discussed above, the coil 20 will be positioned such that the voltages induced into the coils 34 and 36 will be equal in amplitude but opposite in polarity. Not only may the length of the probe be altered but the general characteristics may also be changed. Specifically, a disc may be positioned at the tip of the probe rather than the sphere 30 so that counter bore measurements may be made. Right angle or dog-leg probe tips may also be used with invention with compensation being made for the probe weight differential by means of the screw 14.

Thus it can be seen that the objects of the invention have been achieved by the apparatus and techniques presented and described hereinabove. While in accordance with the Patent Statutes only the preferred embodiment of the invention and the applicant's contemplated best mode for carrying out the same have been presented and described in detail, it is to be understood that the invention is not limited thereto or thereby. Consequently, for a true appreciation of the scope and breadth of the invention reference should be had to the following claims.

What is claimed is:

1. A probe circuit for utilization with a digital height gauge for creating signals indicating such contacting engagement between the probe and a work piece that a measurement should be taken, comprising:
an LVDT having primary and secondary coils and a core positioned therebetween;
a probe having a tip thereon operatively connected to and movable with the coils;
rectifier circuit means connected to the LVDT for receiving electrical signals therefrom indicative of the positional relationship between the coils and the core and producing a DC output signal proportional to said positional relationship, said rectifier circuit means including bias means for producing a bias voltage related to the radius of the probe tip; and
a first operational amplifier connected to said rectifier circuit means and receiving the DC output signal therefrom, the first operational amplifier creating a binary change output signal which occurs upon said DC output signal reaching a particular level, which binary change indicates probe deflection relating to such contacting engagement between the probe and the work piece.

2. The probe circuit as recited in claim 1 wherein the rectifier circuit means comprises a second operational amplifier connected to the LVDT and a half-wave rectifier connected to the second operational amplifier, the second operational amplifier linearly amplifying any voltage differential existing between the secondary coils and the half-wave rectifier converting the amplified voltage differential into said DC output signal.

3. The probe circuit as recited in claim 1 which further includes a meter connected to the rectifier circuit means and creating a visual signal from the output thereof correlated with the deflection of the probe.

4. The probe circuit as recited in claim 1 which further includes a housing wherein the primary and secondary coils are contained and spring means fixedly secured to said housing and said coils for allowing relative linear movement between the coils and the core.

5. The probe circuit as recited in claim 1 wherein said bias means comprises a potentionmeter, adjustment of the potentionmeter providing for compensation of various probe tip radii.

6. A probe circuit for use with electronic digital height gauges comprising:
   a probe mechanically connected to the primary and secondary coils of an LVDT, and having a physical neutral position with relation to the LVDT core;
   a first operation amplifier circuit differentially connected to the secondary coils and receiving therefrom signals indicative of the positional relationship between the coils and the core of the LVDT and including means for converting said signals into varying DC levels,
   a second operational amplifier circuit connected to the first operational amplifier circuit for receiving the varying DC levels and creating signals therefrom indicative of the deflection of the probe from the neutral position and including bias means for producing a bias voltage related to the radius of the probe; and
   a third operational amplifier circuit connected to the second operational amplifier circuit and biased that the output thereof changes when the output of the second operational amplifier exceeds a particular level.

7. The probe circuit as recited in claim 6 which includes adjustment means connected to the core for adjusting the neutral position to compensate for the weight of the probe.

8. The probe circuit as recited in claim 6 which further includes a meter connected to the second operational amplifier circuit, the meter being calibrated so as to indicate linear deflection of the probe from the neutral position.

9. The probe circuit as recited in claim 8 wherein the second operational amplifier circuit has two resistive feedback networks controlling the gain thereof, each feedback network having an adjustable potentionmeter for calibrating the meter, the feedback networks being mutually exclusively connected to the output of the second operational amplifier by means of a selector switch.

10. The probe circuit as recited in claim 6 wherein the bias means comprises an adjustable potentionmeter.

11. The probe circuit as recited in claim 6 wherein the LVDT is contained within a housing, the coils of the LVDT being connected to the housing by flexible connecting means to allow relative movement between the coils and the core, the core of the LVDT being fixedly connected to the housing with a threaded member, the positioning of the coil on said threaded member being adjustable, and the probe extending from the housing in a manner substantially perpendicular to the core.

* * * * *